United States Patent [19]
McFarland et al.

[11] Patent Number: 5,337,603
[45] Date of Patent: Aug. 16, 1994

[54] ELBOW MASS FLOW METER

[75] Inventors: Andrew R. McFarland, College Station, Tex.; John C. Rodgers, Santa Fe, N. Mex.; Carlos A. Ortiz, Bryan, Tex.; David C. Nelson, Santa Fe, N. Mex.

[73] Assignee: The Regents of the University of California Office of Technology Transfer, Alameda, Calif.

[21] Appl. No.: 3,982

[22] Filed: Jan. 15, 1993

[51] Int. Cl.$^5$ ................................................ G01F 5/00
[52] U.S. Cl. ........................................................ 73/202
[58] Field of Search ................. 73/202, 202.5, 861.69, 73/863.61

[56] References Cited

U.S. PATENT DOCUMENTS 4,470,311  9/1984  Southwell ................. 73/861.39

FOREIGN PATENT DOCUMENTS 52153  6/1910  Switzerland ........................... 73/202

OTHER PUBLICATIONS

E. G. Hauptmann, "Take A Second Look At Elbow Meters For Flow Monitoring," Instruments and Control Systems, Oct. 1978, pp. 47–50.

*Primary Examiner*—Herbert Goldstein
*Attorney, Agent, or Firm*—Samuel M. Freund

[57] ABSTRACT

Elbow mass flow meter. The present invention includes a combination of an elbow pressure drop generator and a shunt-type mass flow sensor for providing an output which gives the mass flow rate of a gas that is nearly independent of the density of the gas. For air, the output is also approximately independent of humidity.

4 Claims, 2 Drawing Sheets

ELBOW MASS FLOW METER

BACKGROUND OF THE INVENTION

The present invention relates generally to measurement of mass flow rate of gases and, more particularly, to the use of an elbow pressure drop generator in cooperation with a mass flow sensor to measure mass flow rate of a gas substantially independent of the density of the gas. This invention was made with government support under Contract No. W-7405-ENG-36 awarded by the U.S. Department of Energy. The government has certain rights in the invention.

In industrial and scientific applications, it is frequently necessary to measure the flow rate of gases. Often, the space devoted to the flow meter and its related flow tubing is not of consequence; however, there are situations in which the space is limited as, for example, within the confines of a scientific instrument. Moreover, with scientific apparatus there is generally a need for an electrical analog output from a flow meter. Typically, scientific apparatus will have on-board electronic capabilities for data acquisition, handling and display which may not only justify the need for an electrical analog output from the flow meter, but may necessitate it. There are industrial situations for which the mass flow rate of gases is needed and for which the pressure drop across the flow meter is of concern because of power consumption considerations.

It is known that the pressure drop across an elbow can be used to measure volumetric flow rates since the pressure drop is proportional to the dynamic head of gas flowing through the elbow. See, e.g., E. G. Hauptmann, "Take A Second Look At Elbow Meters For Flow Monitoring," Instruments and Control Systems, October, 1978, pages 47-50. Indeed, the author believes that such meters can be considered a primary flow measuring device and a practical alternative to orifice plates and venturis. In addition, shunt-type mass flow meters have been used to measure the flow rate across linear laminar flow elements. However, the use of a combination of these two technologies has not been described.

There are three companies which manufacture devices which will measure small mass flow rates of gases. A first uses a configuration which requires that the gas must first flow through a flow straightener (long section of straight pipe) before entering the actual flow measurement device. Within the device is a laminar flow element, which produces a pressure drop linear with the flow rate, and governed by the Poiseuille relationship. The pressure drop created by the laminar element flow causes a shunt flow to pass through a thermal anemometer. This flow is also laminar as a result of the dimensions of the tubing and the flow rate through the shunt. As a consequence, there is a direct proportionality between the flow rate through the laminar flow element and the flow rate through the shunt. Since the fluid properties of the fluid which flows through the laminar element and that which flows through the shunt are the same, and since the thermal anemometer measures the mass flow rate through the shunt, the electrical analog signal can be calibrated in terms of the overall mass flow rate through the device. The principal disadvantage of this system is that it is bulky due to the need for obtaining laminar flow in the main restriction. In turn, this necessitates a long, straight section of tubing upstream and downstream of the body of the flow meter. For a unit designed for a flow rate range of 0-100 L/min, the overall length of the meter is 14.2 in. (360 mm). A second device does not have a shunt flow, but rather has a thermal anemometer placed in a straight pipe, where the overall tube length is approximately 11 times the internal diameter of the pipe. For example, such a system designed for a flow rate range of 0-3 cfm (0-85 L/min) would require an overall length of approximately 11 in. (279 mm) for the meter. This meter would be more sensitive to upstream flow conditions than the meter described above, since passages in the laminar flow element of that system would eliminate any swirl in the flow. The added pressure resistance of the laminar flow elements would also tend to smooth the velocity profile across the tube cross section. The second meter may not have a sufficiently long approach tube. Experiments have shown that more than 40 pipe diameters are required for the complete mixing of a trace gas into a carrier gas. Since mass and momentum mix similarly in a flow, assurance of a constant velocity profile would be obtained only if the length of the approach tube were approximately 40 tube diameters. The ratio of entrance length to tube diameter for that device is approximately 16.

A third apparatus employs an orifice in the main flow passage and a laminar flow element as a shunt across the orifice. A screw is driven into the orifice to produce the pressure differential needed to cause the proper flow through the shunt mass flow meter. The combined orifice and thermal anemometer provide a readout that is proportional to mass flow rate; however, each unit must be separately calibrated. Also, if the screw setting is changed in maintenance, or if the screw should move as a consequence of vibrations or other phenomena, the unit will give an erroneous output signal.

Accordingly, it is an object of the present invention to provide an apparatus for measuring the mass flow rate of a turbulent gas through pipes or tubes.

Another object of the invention is to provide an apparatus for measuring the mass flow rate of a turbulent gas through pipes or tubes without significant loss in pressure in the pipe or tube.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for measuring mass flow in gases of this invention may comprise in combination: an elbow in which turbulent flow of the gas to be investigated is established, the upstream leg thereof having a sampling port therein and the downstream leg also having a sampling port therein; and a shunt-type mass flow meter having its input port attached to the upstream sampling port of the elbow for receiving a portion of the turbulent flow from the elbow, and its output port being attached to the downstream sampling port of the elbow such that after flowing through the mass flow meter, the portion of the turbulent flow entering the flow meter is returned to the elbow.

Benefits and advantages of the present invention include an alternative to other types of flow metering devices such as obstruction meters (nozzles, venturis, and orifices) or rotameters, for situations where the flow is turbulent. The subject elbow mass flow meter is scalable from small-sized devices with flow rates of only a few cfm to large devices with flow rates of hundreds of thousands of cfm. Moreover, once the elbow is calibrated, recalibration is unnecessary since the loss coefficient remains constant under turbulent flow conditions. Since shunt meters require periodic recalibration, this is of particular importance for large systems, since the part of the mass flow meter that would need calibration is only approximately 1 in. in size.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Briefly, the present invention includes an elbow pressure drop generator together with a mass flow sensor for measuring the mass flow rate of gases. There is only a small pressure drop across the elbow, and an electrical analog output signal is generated by the mass flow sensor. The subject apparatus includes an elbow with a by-pass (shunt) mass flow sensor. Turbulent flow is established through the elbow, and flow through the by-pass tubing is laminar. As gas flows through the elbow, there is a pressure loss across the elbow which is enhanced by the mitered form of the elbow.

The invention utilizes turbulent flow in the main stream through an elbow and laminar flow in the shunt stream through a mass flow sensor. Turbulent flows are associated with larger flow rates which implies that the diameter of the flow cross-section of a device in which the flow is turbulent will be smaller than if the flow is laminar. For the elbow meter of the present invention, the length is only 3.2 in. (81 mm) as compared with the first commercial apparatus described above, which operates with the main flow in the laminar regime in order to provide a linear relationship between the main flow and the shunt flow, and has a length of 13.8 in. (360 mm). Even though the second commercial apparatus described above can operate in the turbulent regime, it must have a well-developed profile at the entrance of the sensing region in order to infer the flow rate through the tube from an anemometer reading at a single point in the flow. This is achieved through the use of long tubes on the upstream and downstream sides of the anemometer. The third commercial device described above utilizes a mass flow meter which measures flow shunted across an orifice. It employs a screw driven into the flow to create the appropriate resistance. This system would not be practical for measurement of large flows due to the need to calibrate each combination of orifice and screw configuration. Without a screw, a well-designed orifice meter causes about twice the pressure loss as an elbow meter.

Figure 1:
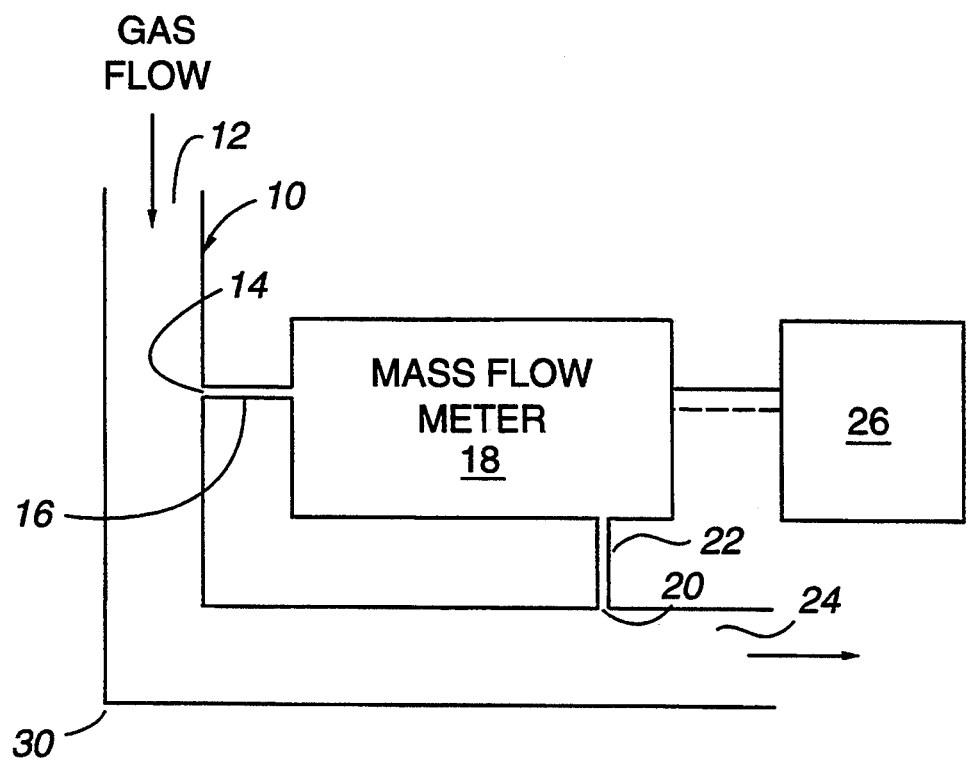
FIG. 1 shows a schematic representation of the apparatus of the present invention illustrating, in particular, the combination of the elbow and the mass flow sensor to measure the mass flow rate of a gas.

Reference will now be made in detail to the present preferred embodiments of the invention, examples of which are illustrated in the accompanying drawings. Similar or identical structure is identified by identical callouts. Turning now to the drawings, FIG. 1 shows a schematic representation of the apparatus of the present invention, showing the combination of an elbow to generate a pressure drop related to the primary flow therein and a mass flow sensor to generate an electrical signal, based on a portion of the total flow shunted through it, which can be calibrated to accurately measure the mass flow of gas entering the elbow. Gas flow enters elbow 10 at opening 12 and passes first sampling port 14. A portion of the gas flows through sampling port 14 and input shunt tube 16, and into a laminar flow thermal anemometer mass flow sensor 18. After passing through the anemometer, the gas is returned to the flow in the elbow at second sampling port 20 through exit shunt tube 22. The gas flow exits elbow 12 through opening 24. The pressure is higher at port 14 than at port 20 due to flow separation and other flow losses in the elbow; and, as a consequence, when the two points are connected by a shunt tube, this pressure difference will cause there to be a flow of gas through the shunt tube. The output from mass flow sensor 18, which gives an electrical analog output related to the mass flow rate through the shunt tube, which in turn, is related to the mass flow rate through the elbow, is directed to signal processor 26 for linearization and conversion into mass or volume flow data for utilization in flow control, flow monitoring, etc.

Figure 2:
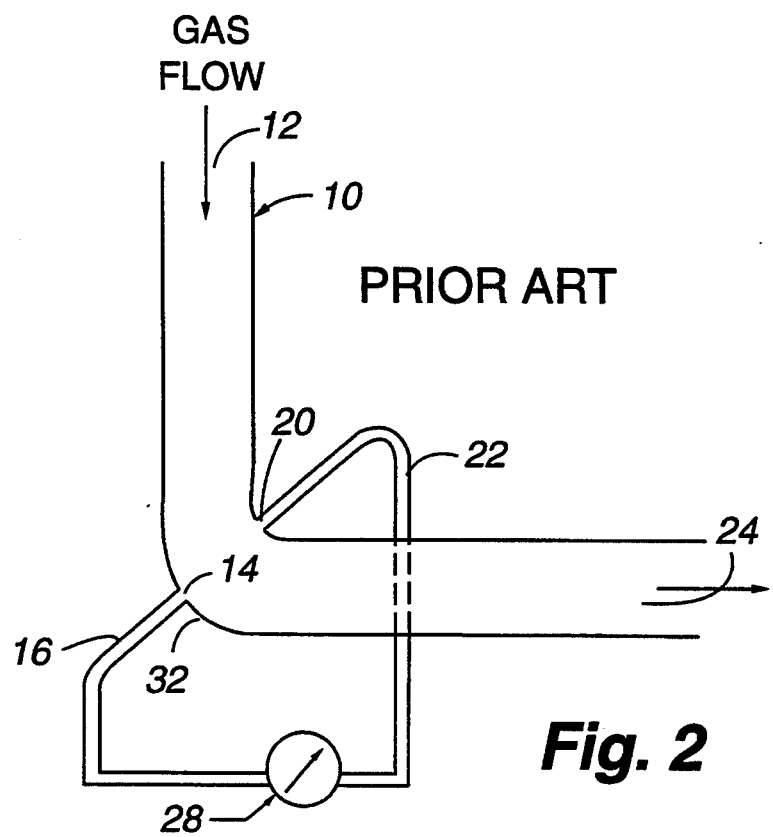
FIG. 2 shows a schematic representation of an existing volumetric flow metering apparatus utilizing an elbow and a pressure sensing apparatus.

FIG. 2 shows a schematic representation of a currently used volumetric flow meter. Note that the sampling ports 14 and 20 are positioned in different locations along elbow 12 than those of FIG. 1. Moreover, elbow 12 in FIG. 1 hereof is a mitered elbow 30, as opposed to the radiused elbow 32 of FIG. 2. Pressure gauge 28 measures the pressure difference between the two sampling ports 14, 20, which may be related to the volumetric flow in elbow 10.

When a fluid such as air flows through an elbow, pressure is lost due to fluid friction with the walls, flow separation in the elbow, and the setup of secondary flow (counter-rotating vortices). If the flow through the elbow is turbulent, incompressible and steady, the pressure differential across the elbow, $\Delta P$, is given in terms of the dynamic pressure, $\rho U^2/2$, as:

$$\Delta P = P_1 - P_2 = K \frac{\rho U^2}{2} \quad (1)$$

Here, $P_1$ and $P_2$ are the static pressures upstream and downstream of the elbow, at locations approximately as shown for the ports in FIG. 1 hereof; $\rho$ is the fluid density; and U is the mean fluid velocity at a cylindrical cross section of the elbow. The parameter, K, is generally considered to be a function of geometry if the flow is turbulent. For mitered elbows, the value of K is approximately 1.1.

Elbow flow meters used in the past did not have mitered bends and did not employ pressure ports in the locations shown in FIG. 1 hereof, but rather were formed from radial bends and had pressure ports as shown in FIG. 2 hereof. With the pressure ports positioned in the bend itself, with one port on the outside and the other on the inside thereof, the pressure measurement derives from the centrifugal force of the fluid in the elbow. The change in linear momentum as the fluid turns the corner in the elbow produces a pressure differential, $P_3 - P_4$, which is:

$$P_3 - P_4 = C_k \frac{\rho U^2}{2} \qquad (2)$$

where $P_3$ and $P_4$ are the static pressures upstream and downstream of the elbow, at locations approximately as shown for the ports in FIG. 2 hereof, and $C_k$ is a flow coefficient with a value between 0.56 and 0.88. Thus, although the form of equations (1) and (2) are the same, the force-producing mechanisms are quite different. The difference is reflected in the difference in value of the empirical coefficient in these equations. For the present invention, the pressure ports are positioned such that while the static pressure difference produced by the bend is registered, the centrifugal force and perturbations in the region of the bend are not registered. This typically requires positioning the upstream port about two tube diameters upstream of the bend, and the downstream port about four tube diameters downstream from the bend. The exact positioning is not critical, but should be determined in each application such that the intense turbulent effects of the bend have had an opportunity to damp out. The use of a mitered bend may be considered optional, but would be used if a higher pressure drop is needed to match the requirements of a flow sensing element. In use, the pressure drop, $\Delta P$, is measured and it is assumed that the density and the flow coefficient are known. This allows the velocity to be calculated from:

$$U = \sqrt{\frac{2\Delta P}{C_k \rho}} \qquad (3)$$

In turn, the volumetric flow rate, Q, through the elbow meter is given by:

$$Q = UA \qquad (4)$$

where A is the cross sectional area of the elbow.

Of importance to the present invention is the fact that previously, the elbow pressure drop generator has been considered as a volumetric flow meter based simply on measurement of the pressure difference, not mass flow. The present invention permits an elbow pressure drop generator to be used as a mass flow meter, which senses the mass flow rate, m, where:

$$\overset{\circ}{m} = \rho A U = \rho Q \qquad (5)$$

No knowledge of density is needed to obtain the mass flow rate from a mass flow meter. However, if the density is known, then the volumetric flow rate through a mass flow meter can be calculated from Equation 5.

Also of importance to the present invention is that the pressure drop across an elbow is a function of the flow coefficient and the dynamic head (Equation 1). In general terms, for flow in the turbulent regime, the value of the flow coefficient can be expected to be relatively constant. Thus, once an elbow is calibrated, the relationship between pressure drop and dynamic pressure will not change.

The use of thermal anemometers for sensing the mass flux in a flow field is well known. A heated element such as a small cylinder is placed in the flow. Often, heating is accomplished by applying a voltage to either a fine wire about the element or to the semiconductor which forms the element. When a fluid such as air at room temperature flows across the heated wire or semiconductor, it tends to cool the wire. Usually, the wire or semiconductor is operated at a constant temperature, which means that additional electrical power needs to be added to the system to maintain the temperature constant when it is exposed to a flow field. Because there is a known relationship between temperature and resistance for conductors and semiconductors, the constancy of temperature can be achieved by maintaining a constancy of electrical resistance. The system is compensated for changes in ambient temperature which would affect the resistance of the wire or semiconductor.

The relationship between the mass flux of the fluid and the voltage applied to a constant temperature thermal anemometer is known as King's law. If the flow field at the sensor location is not affected by changes in either flow rate or fluid properties, the mass flux is linearly related to the mass flow rate. Thus, for a given gas (e.g., air or natural gas) and for a given geometry of the system, the mass flow rate can be calculated by measurement of the voltage applied to the anemometer circuit. The calculation involves use of a calibration curve or equation.

A prototype of the elbow meter has been constructed and tested. This version can be used over the flow rate range of 0-185 cfh (0-87 L/rain). The longest dimension of the meter is 3.2 in. (81 ram).

At a flow rate of 120 cfh (56.6 L/rain), the flow in the elbow meter is turbulent as indicated by the Reynolds number, Re, which has a value of approximately 8800. It can be shown that the mass flow rate through an elbow in which the flow is turbulent can be determined by measuring the voltage output from a laminar mass flow shunt meter. The reading does not depend upon the density of the fluid, but only the calibration constants of the system and the viscosity of the fluid. Although temperature affects viscosity, the influence upon the mass flow rate is small since viscosity changes approximately with the square root of temperature and mass flow rate changes with the square root of viscosity. This causes mass flow rate to vary approximately with the fourth root of absolute temperature. Calibration data are used to determine the values of the coefficients of a cubic polynomial relating the mass flow rate and powers of the voltage output.

The invention has a broad range of applications. Because it is compact in form, it can be used to measure the mass flow rate through scientific instruments. Also, because it has a low pressure drop and it provides the mass flow rate rather than the volumetric flow rate, it could be used extensively in industrial systems that involve large flow rates. For example, in fossil fuel-fired power plants there is a need to measure the mass flow rate of combustion air, and the elbow meter could perform this function accurately. In the transport of natural gas, the current technology involves the use of orifice meters which provide data on volumetric flow rate; however, the energy content of the fuel is dependent upon the mass, not volume, of natural gas. Elbow meters could replace the orifice meters and provide more appropriate and more accurate data with a lower head loss across the meter.

The elbow mass flow meter was tested to determine if environmental parameters (pressure, temperature and relative humidity) would have an influence on its performance. Tests were performed by connecting the present elbow meter in series with a calibrated rotameter whose readings were corrected for density effects. Air was drawn through the system by a vacuum pump and the flow rate was controlled by a valve. The rotameter, pump, flow control valve, and the elbow meter were placed in different chambers in which the environmental conditions could be varied.

Figure 3:
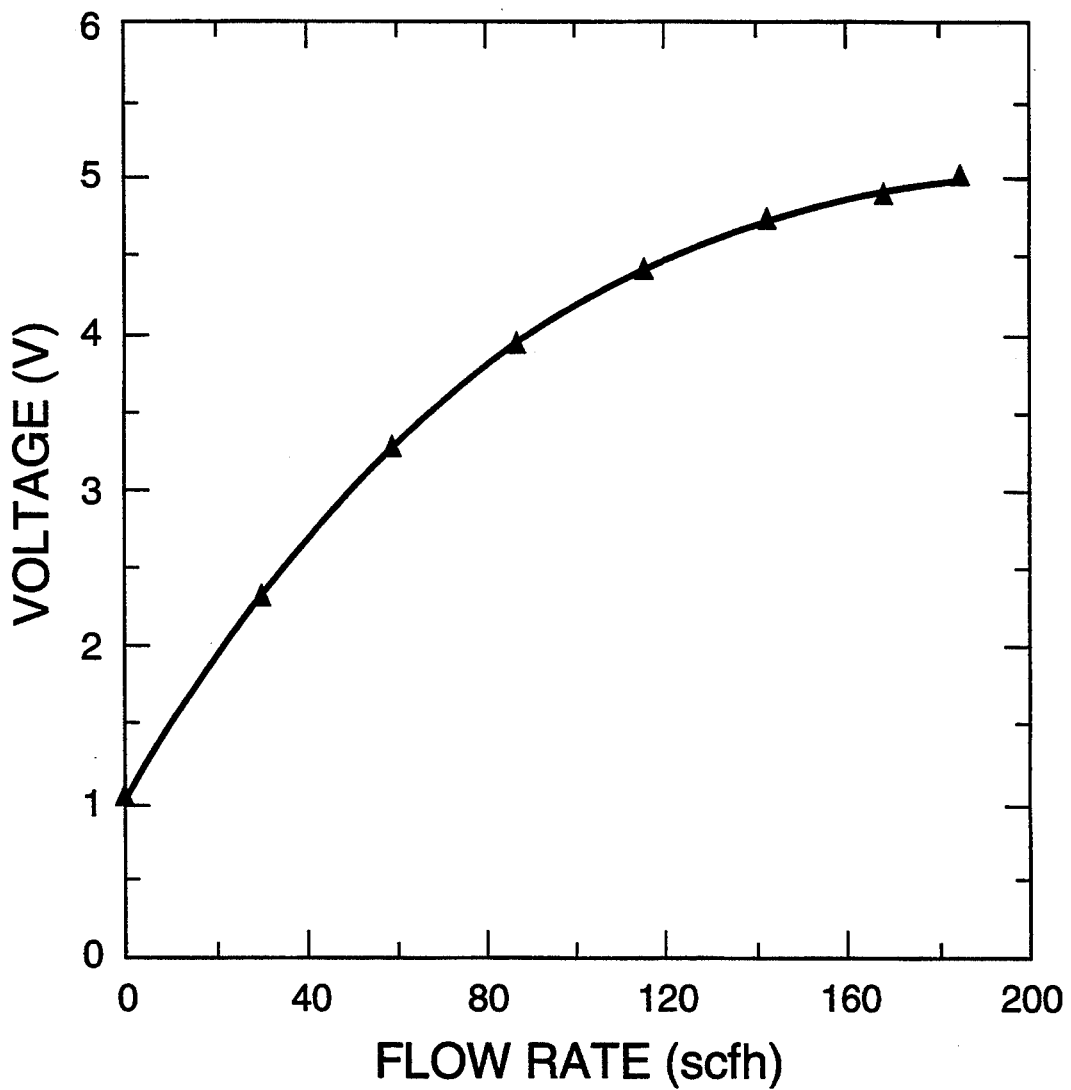
FIG. 3 shows a calibration curve for the subject flow meter.

Calibration data from the elbow meter, when it was operated under laboratory conditions of 24° C. and 50% relative humidity, are shown in FIG. 3. Duplicate tests were conducted at each condition. The curve is monotonic over the standard mass flow rate range of 0 to 185 scfh (0–87 Lstd/min).

Similar curves were generated for other environmental conditions. The data are presented in a truncated form in Table 1, where the analog voltage from the elbow meter is given for a standard mass flow rate of 115 scfh (54.2 $L_{std}$/min). For a standard mass flow rate range of 0 to 185 scfh, the voltage output of the shunt is 1–5 volts. However, for the setting of 115 scfh, the coefficient of variation of the experimental values given In Table 1 is less than 1%. These environmental conditions cover temperatures from −15° to 39° C. and relative humidities from 10 to 90%.

TABLE 1

Calibration of the Elbow Meter at Various Environmental Conditions. The standard mass flow rate through the elbow meter was set at 115 scfh (54.2 $L_{std}$/min) and the results are given as the output voltage from the elbow meter.

| Temperature, °C. | Relative Humidity, % | Output voltage, E, volts |
|---|---|---|
| 24 | 50 | 4.39 |
| 24 | 13 | 4.39 |
| 24 | 90 | 4.41 |
| −15 | 68 | 4.37 |
| 1 | 80 | 4.41 |
| 39 | 23 | 4.43 |

The system was tested at a range of simulated barometric pressures. The elbow mass flow meter was placed inside an evacuated chamber. Air was drawn into the elbow mass flow meter, and then passed through a Sierra Instruments, Inc., mass flow meter which was located outside of the chamber. The flow was then drawn through a control valve, into a pump, and discharged to the atmosphere. Mass flow rate through the elbow mass flow meter was determined through measurement of the voltage output of the shunt meter and use of a calibration equation which had the coefficients fitted from tests conducted at normal laboratory environmental conditions. Results from these experiments are given in Table 2, where it may be noted that for flow rates of 1, 2, and 3 cfm and for a range of pressures from approximately 21 inches of mercury to 30 inches of mercury, the mass flow rates (in units of scfm) determined with the elbow mass flow meter were identical to those measured with the Sierra Instruments, Inc., mass flow meter.

TABLE 2

Effect of barometric pressure on the elbow mass flow meter. The elbow meter was operated in series with a Sierra mass flow meter at different mass flow rates (in units of scfm) and different values of absolute pressure.

| Barometric Pressure, inches of mercury | Mass flow rate from use of Sierra mass flow meter, scfm | Mass flow rate determined from use of elbow meter, scfm |
|---|---|---|
| 29.9 | 3.0 | 3.0 |
| 25.6 | 3.0 | 3.0 |
| 21.9 | 3.0 | 3.0 |
| 29.9 | 2.0 | 2.0 |
| 26.6 | 2.0 | 2.0 |
| 24.3 | 2.0 | 2.0 |
| 21.2 | 2.0 | 2.0 |
| 29.9 | 1.0 | 1.0 |
| 26.2 | 1.0 | 1.0 |
| 24.0 | 1.0 | 1.0 |
| 21.1 | 1.0 | 1.0 |

The configuration of the prototype elbow mass flow meter has a nominal flow rate of 2 cfm (57 L/min) and a mitered bend. The bore (inside diameter) of the elbow is 11/32 in. The port for shunt flow on the upstream side of the elbow is located about two diameters from the center of the bend while the port for the shunt flow on the downstream side of the bend is located approximately 4 diameters from the center of the bend. The shunt airstream flows from the upstream port, through tubing and thence into the laminar mass flow sensor. The flow is then rejoined with the main flow through the elbow at the downstream port. The ports and connecting tubing are sized such that the pressure loss across these elements is small in comparison with the pressure loss through the laminar mass flow sensor.

The shunt laminar mass flow sensor is attached directly to the body of the elbow. This embodiment of the invention is used as a mass flow meter in a commercially available instrument (Alpha Sentry, Canberra Industries, Inc.) for measuring the alpha activity of transuranic aerosols.

The meter can be used for either larger or smaller flow rates by scaling the dimensions of the preferred embodiment.

The foregoing description of the invention has been presented for purposes of illustration and description and is not intended to be exhaustive or to limit the invention to the precise form disclosed, and obviously many modifications and variations are possible in light of the above teaching. For example, others skilled in the art could conceive of shunt-type elbow meters with different configurations such as the use of non-mitered elbows or which would have pressure ports in other locations than those shown in the preferred embodiment. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for measuring mass flow in gases which comprises in combination:
   an elbow in which turbulent flow of the gas to be investigated is established, said elbow including a first straight leg and a second straight leg, the first straight leg being located upstream from the second straight leg, and having a first sampling port therein and the second straight leg having a second sampling port therein; and a shunt-type mass flow sensor having an input port and an output port, the input port being attached to the first sampling port and being adapted to receive a portion of the turbulent flow from said elbow, and the output port thereof being attached to the second sampling port such that after flowing through said mass flow sensor, the portion of the turbulent flow entering said flow sensor is returned to said elbow.

2. The gas flow measuring apparatus as described in claim 1, wherein said shunt-type mass flow sensor is a laminar flow thermal anemometer.

3. The gas flow measuring apparatus as described in claim 1, wherein said elbow is mitered, whereby turbulent flow is established therein.

4. A method for measuring mass flow in gases which comprises the steps of:

establishing turbulent flow of the gas to be investigated in an elbow, the elbow including a first straight input leg and a second straight output leg;

diverting a small portion of the gas entering the input leg of the elbow into a shunt-type mass flow sensor; and returning the gas passing through the flow sensor to the output leg of the elbow.

* * * * *